United States Patent
Chowdhry et al.

(10) Patent No.: US 7,417,098 B2
(45) Date of Patent: Aug. 26, 2008

(54) METHOD FOR EMULSION POLYMERISATION OF OLEFINS

(75) Inventors: Mubarik Mahmood Chowdhry, Strasbourg (FR); Xavier Sava, Mannheim (DE); Monica Haag, Ludwigshafen (DE); Jacob Wildeson, Ludwigshafen (DE); Stefan Mecking, Freiburg (DE); Ludmila Kolb, Lahr (DE)

(73) Assignee: BASF SE, Ludwigshafen (DE)

( * ) Notice: Subject to any disclaimer, the term of this patent is extended or adjusted under 35 U.S.C. 154(b) by 4 days.

(21) Appl. No.: 10/579,098

(22) PCT Filed: Nov. 6, 2004

(86) PCT No.: PCT/EP2004/012597

§ 371 (c)(1), (2), (4) Date: May 12, 2006

(87) PCT Pub. No.: WO2005/049669

PCT Pub. Date: Jun. 2, 2005

(65) Prior Publication Data

US 2007/0043163 A1    Feb. 22, 2007

(30) Foreign Application Priority Data

Nov. 14, 2003   (DE) ................................. 103 53 558

(51) Int. Cl.
*C08F 4/42*    (2006.01)

(52) U.S. Cl. ........................ 526/172; 526/142; 526/348; 502/103; 502/125

(58) Field of Classification Search ................. 526/142, 526/172, 348; 502/103, 125
See application file for complete search history.

(56) References Cited

U.S. PATENT DOCUMENTS

| 5,574,091 | A |  | 11/1996 | Walther et al. |
| 5,686,542 | A | * | 11/1997 | Ostoja-Starzewski et al. . 526/75 |
| 2004/0167259 | A1 |  | 8/2004 | Schmid et al. |
| 2005/0261452 | A1 |  | 11/2005 | Chowdhry et al. |

FOREIGN PATENT DOCUMENTS

| DE | 102 34 005 | 2/2004 |
| EP | 0 046 331 | 2/1982 |
| WO | 01 44325 | 6/2001 |
| WO | 03 006528 | 1/2003 |

OTHER PUBLICATIONS

Bauers et al. Macromolecules, 36, 6711-6715 (2003).*
Bauers et al., "Catalytic Polymerization of Ethylene in Aqueous Emulsion With a Simple in Situ Catalyst", Macromolecules, vol. 36, pp. 6711-6715, 2003, XP002259050.
Bastero et al., "Catalytic Ethylene Polymerization in Aqueous Emulsion: Catalyst Tailoring and Synthesis of Very Small Latex Particles", Polymeric Materials: Science and Engineering, vol. 90, pp. 740-741, 2004, XP008043244.

* cited by examiner

*Primary Examiner*—Ling-Siu Choi
(74) *Attorney, Agent, or Firm*—Oblon, Spivak, McClelland, Maier & Neustadt, P.C.

(57) ABSTRACT

Process for the emulsion polymerization of one or more olefins by reacting a quinoid compound with a metal compound and a phosphine compound which is substituted by at least one polar radical and subsequently using the reaction product for the polymerization or copolymerization of olefins in water or in a solvent mixture which contains at least 50% by weight of water and at least one emulsifier.

7 Claims, No Drawings

METHOD FOR EMULSION POLYMERISATION OF OLEFINS

TITLE OF THE INVENTION

Emulsion polymerization of olefins

BACKGROUND OF THE INVENTION

1. Field of the Invention

The present invention relates to a process for the emulsion polymerization of one or more olefins by reacting a quinoid compound of the formula Ia or Ib or a mixture of at least two of the compounds Ia or Ib

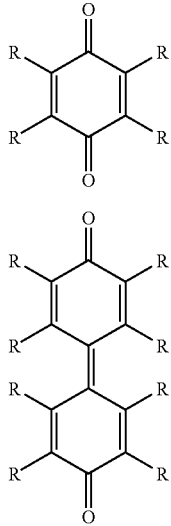

where R in each case is one or more of the following radicals:

hydrogen halogen nitrile $C_1$-$C_{12}$-alkyl groups, $C_1$-$C_{12}$-alkoxy groups, $C_7$-$C_{15}$-aralkyl groups, $C_6$-$C_{14}$-aryl groups, unsubstituted or substituted by: $C_1$-$C_{12}$-alkl groups, halogens, $C_1$-$C_{12}$-alkoxy groups, $C_3$-$C_{12}$-cycloalkyl groups, $C_1$-$C_{12}$-thioether groups, if appropriate also carboxyl groups or sulfo groups present in the form of their salts, and amino groups with hydrogen and/or $C_1$-$C_{12}$-alkyl radicals, amino groups $NR^1R^2$, where $R^1$ and $R^2$ together or separately are hydrogen, $C_1$-$C_{12}$-alkyl groups, $C_7$-$C_{15}$-aralkyl radicals and $C_6$-$C_{14}$-aryl groups and may additionally also form a saturated or unsaturated 5- to 10-membered ring, unsubstituted or substituted by: $C_1$-$C_{12}$-alkyl groups, halogens, $C_1$-$C_{12}$-alkoxy groups, $C_3$-$C_{12}$-cycloalkyl groups, $C_1$-$C_{12}$-thioether groups, if appropriate also carboxyl groups or sulfo groups present in the form of their salts, and amino groups with hydrogen and/or $C_1$-$C_{12}$-alkyl radicals, it being possible for identical or different compounds of the formulae Ia and Ib if appropriate also to be bridged by one or more $C_1$-$C_{12}$-alkylene bridges, $C_2$-$C_{12}$-alkylated azo bridges or bridges of the formula II

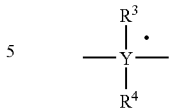

where Y is silicon or germanium and $R^3$ and $R^4$ are hydrogen and/or a $C_1$-$C_{12}$-alkyl group, with a phosphine compound, and with a metal compound of the formula $M(L^2)_2$, $M(L^2)_2(L^1)_{z1}$ or $M(L^1)_{z2}$, where M is a transition metal of groups 7 to 10 of the Periodic Table of the Elements, $L^1$ is a phosphane $(R^5)_xPH_{3-x}$ or amine $(R^5)_xNH_{3-x}$ having identical or different radicals $R^5$, an ether $(R^5)_2O$, water, an alcohol $(R^5)OH$, pyridine, a pyridine derivative of the formula $C_5H_{5-x}(R^5)_xN$, carbon monoxide, $C_1$-$C_{12}$-alkylnitrile, $C_6$-$C_{14}$-arylnitrile or an ethylenically unsaturated double bond system, where x is an integer from 0 to 3, $R^5$ is hydrogen, a $C_1$-$C_{12}$-alkyl group, which in turn may be substituted by $O(C_1$-$C_6$-alkyl$)$ or $N$—$(C_1$-$C_6$-alkyl$)_2$ groups, a $C_3$-$C_{12}$-cycloalkyl group, a $C_7$-$C_{15}$-aralkyl radical or a $C_6$-$C_{14}$-aryl group, $L^2$ is a halide ion, an amide anion $(R^6)_yNH^\square_{2-y}$, where y is an integer from 0 to 2 and $R^6$ is a $C_1$-$C_{12}$-alkyl group, and furthermore a $C_1$-$C_6$-alkyl anion, allyl anion, benzyl anion or aryl anion, where $L^1$ and $L^2$ may be linked to one another by one or more covalent bonds, z1 is an integer from 1 to 4, and z2 is an integer from 1 to 6, and subsequently using the reaction product for the polymerization or copolymerization of olefins in water or in a solvent mixture which contains at least 50% by weight of water, in the presence of an emulsifier and optionally in the presence of an activator, wherein the phosphine compound used is either a compound III of the formula $(R')_aPH_{3-a}$, where R' is a $C_1$-$C_{12}$-alkyl group, $C_3$-$C_{12}$-cycloalkyl group, $C_7$-$C_{15}$-aralkyl group or $C_6$-$C_{14}$-aryl group, which is substituted by at least one polar radical P, the polar radical P being selected from the group consisting of hydroxyl, carboxyl, sulfo, hydroxysulfonyloxy or phosphono groups and the possible alkali metal, alkaline earth metal and/or ammonium salts thereof, alkanolammonium, pyridinium, imidazolinium, oxazolinium, morpholinium, thiazolinium, quinolinium, isoquinolinium, tropylium, sulfonium, guanidinium and phosphonium groups and ammonium groups of the formula IV —$N^\oplus R^7R^8R^9$ IV, where $R^7$, $R^8$ and $R^9$, independently of one another, are hydrogen or a $C_1$-$C_{12}$-alkyl group, or a group of the formula V, VI or VII -(EO)$_k$—(PO)$_l$—R$^{10}$          V, -(PO)$_l$—(EO)$_k$—R$^{10}$          VI, -(EO)$_k$/PO$_l$)—R$^{10}$          VII, where EO is a —$CH_2$—$CH_2$—O— group, PO is a —$CH_2$—$CH(CH_3)$—O— or a —$CH(CH_3)$—$CH_2$—O— group, k and l are numerical values from 0 to 50, but k and l are not simultaneously 0, $R^{10}$ is hydrogen, a $C_1$-$C_{12}$-alkyl group or a sulfo group or the corresponding alkali metal, alkaline earth metal and/or ammonium salt thereof, and a is 1,2 or 3, and/or a diphosphine compound VIII of the formula $(R')_b PH_{2-b}$-G-PR$_2$", where R" is hydrogen or has the same meaning as R', G is a $C_1$-$C_{12}$-alkylene group, $C_3$-$C_{12}$-cycloalkylene group, $C_7$-$C_{15}$-aralkylene group or $C_6$-$C_{14}$-arylene group, and b is 1 or 2.

Isolation and purification of the complex formed in situ (reaction product of metal compound, phosphine compound and quinoid compound) are dispensed with.

2. Description of the Background

An activator is optionally used for the novel process. Furthermore, this invention relates to dispersions of polyolefins, for example polyethylene and ethylene copolymers in water, and the use of the novel aqueous dispersions in paper applications and textile and leather applications, for the production of molded foams, carpet backing coatings and pharmaceutical formulations and as a component in adhesives, sealing compounds, plastics renders, coating materials and paints.

Aqueous dispersions of polymers are utilized commercially in numerous applications which differ very greatly. Examples are paper applications (coating and surface sizing), raw materials for paints and finishes, adhesive raw materials (including contact adhesives), textile and leather applications, in construction chemistry, molded foams (mattresses, carpet backing coatings) and for medical and pharmaceutical products, for example as binders for preparations. A summary is to be found in D. Distler (Editor), Wäβrige Polymerdispersionen, Wiley-VCH Verlag, 1st Edition, 1999.

It has been difficult to date to prepare aqueous dispersions of polyolefins. However, it would be desirable to be able to provide such aqueous dispersions of polyolefins because the monomers, such as ethylene or propylene, are very advantageous from economic points of view.

The conventional process for the preparation of such aqueous dispersions from corresponding olefins make use either of free radical high-pressure polymerization or of the preparation of secondary dispersions.

These processes therefore have disadvantages. The free radical polymerization processes require extremely high pressures, they are limited on the industrial scale to ethylene and ethylene copolymers, and the required apparatuses are very expensive to procure and maintain. The other possibility consists in first polymerizing ethylene in any desired process and then preparing a secondary dispersion, as described in U.S. Pat. No. 5,574,091. This method is a multistage process and therefore very complicated.

It is therefore desirable to polymerize olefins, for example ethylene or propylene, under the conditions of emulsion polymerization, and to prepare the required dispersion in one step from the corresponding olefin. Moreover, emulsion polymerization processes very generally have the advantage that they give polymers having high molar masses, the removal of heat being readily controlled as a result of the process. Finally, reactions in aqueous systems very generally are of interest because water is a cheap and environmentally friendly reaction medium.

Processes presented to date for the emulsion polymerization of olefins, such as ethylene or propylene, still require improvement. The problem lies in general in the catalyst required for the polymerization of these olefins.

Owing to the considerable commercial importance of polyolefins, the search for improved polymerization processes continues to be of great importance.

A good overview of the prior art on the polymerization of olefins in an aqueous medium, in particular with the use of polymerization catalysts prepared in situ, is given by the non-prior-published Patent Application with Application No. 10234005.6, filed by the Applicant at the German Patent and Trademark Office. The subject of this Application, which is hereby incorporated by reference, is the broad use of special quinoid compounds, usually phosphine or diphosphine compounds and especially transition metal compounds, for the in situ preparation of polymerization catalysts and the use thereof for the polymerization of olefins in an aqueous medium. The in situ catalysts mentioned in the description as being preferred and used in the examples were prepared using 2,3,5,6-tetrachloro-para-benzoquinone or 2,3,5,6-tetrabrom-para-benzoquinone and triphenylphosphine as the ligand compound. However, the use of very poorly water-soluble organic solvents, for example hexadecane, in the preparation of the in situ catalysts is not completely satisfactory. Also unsatisfactory is the fact that the in situ catalysts present as organic solutions are subjected, before being brought into contact with the olefin, to a treatment which converts the organic catalyst solutions into oil-in-water miniemulsions.

SUMMARY OF THE INVENTION

It is an object of the present invention to provide an improved process which gives polymer dispersions having good polymer solids contents even without the poorly water-soluble organic solvents and without the provision of oil-in-water catalyst miniemulsions.

We have found that this object is achieved by the process defined at the outset.

DETAILED DESCRIPTION OF THE PREFERRED EMBODIMENTS

Examples of suitable olefins for the polymerization are: ethylene, propylene, 1-butene, 1-pentene, 1-hexene, 1-heptene, 1-octene, 1-decene and 1-eicosene, but also branched olefins, such as 4-methyl-1-pentene, vinylcyclohexene and vinylcyclohexane, and styrene, para-methylstyrene and para-vinylpyridine, ethylene and propylene being preferred. Ethylene is particularly preferred.

In addition to one of the abovementioned main olefins, at least one further olefin can also be used as a coolefin for the polymerization, it being possible to select the at least one coolefin from the following groups:

ethylene and 1-olefins, such as propylene, 1-butene, 1-pentene, 1-hexene, 1-heptene, 1-octene, 1-decene and 1-eicosene, but also branched olefins, such as 4-methyl-1-pentene, vinylcyclohexene and vinylcyclohexane, and styrene, para-methylstyrene and para-vinylpyridine, propylene, 1-butene, 1-pentene, 1-hexene, 1-heptene, 1-octene and 1-decene being preferred;

internal olefins, such as norbornene, norbornadiene or cis- or trans-2-butene or cyclopentene;

polar olefins, such as acrylic acid, $C_1$-$C_8$-alkyl acrylates, 2-hydroxyethyl acrylate, 3-hydroxypropyl acrylate, 4-hydroxybutyl acrylate, methacrylic acid, $C_1$-$C_8$-alkyl methacrylates, $C_1$-$C_6$-alkyl vinyl ethers and vinyl acetate, and silyloxy compounds, such as 3-(trimethoxysilyl)butyl methacrylate, 3-(triphenoxysilyl)butyl methacrylate, vinyltrimethoxysilane, vinyltriethoxysilane or vinyltriphenoxysilane; acrylic acid, methyl acrylate, ethyl acrylate, n-butyl acrylate, 2-ethylhexyl acrylate, 2-hydroxyethyl acrylate, methyl methacrylate, ethyl methacrylate, n-butyl methacrylate, ethyl vinyl ether and vinyl acetate are preferred.

The ratio of the main olefin to the at least one coolefin can be freely chosen, the main olefin being used in the mixture to be polymerized in an amount of $\geq 50$ mol % and the total amount of the at least one coolefin being $\leq 50$ mol %. Frequently, however, only a main olefin is used for the polymerization. When at least one coolefin is used, the total amount of coolefin is often $\leq 40$, $\leq 30$, $\leq 20$ or $\leq 10$ mol % and $\geq 0.1$, $\geq 0.5$, $\geq 1$, $\geq 5$ or $\geq 10$ mol % and all values in between.

What is of importance is that frequently olefin mixtures are used for the novel polymerization, at least one of the olefins used being ethylene. Ethylene is often the main olefin, and the coolefin is selected from the group consisting of propylene, 1-butene, 1-hexene and styrene.

However, it is also possible to use only one olefin for the polymerization. For this purpose, in particular ethylene, propylene, 1-butene, 1-pentene, 1-hexene, 1-heptene, 1-octene, 1-decene or 1-eicosene is used, but also branched olefins, such as 4-methyl-1-pentene, vinylcyclohexene and vinylcyclohexane, and styrene, para-methylstyrene and para-vinylpyridine, although ethylene and propylene are preferred. Ethylene is particularly preferred.

In the quinoid compounds of the formulae Ia and Ib, the radicals are defined as follows:

R is selected from in each case one or more of the following radicals:

hydrogen halogens, i.e. atoms of fluorine, chlorine, bromine or iodine; fluorine, chlorine and bromine being preferred nitrile $C_1$-$C_{12}$-alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl and n-dodecyl; preferably $C_1$-$C_6$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl or sec-hexyl, particularly preferably $C_1$-$C_4$-alkyl, such as methyl, ethyl, -n-propyl, isopropyl, n-butyl, isobutyl, sec-butyl and tert-butyl $C_1$-$C_{12}$-alkoxy groups, such as examples mentioned for $C_1$-$C_{12}$-alkyl groups, in each case also provided with an oxygen atom at the end of the group (for example methoxy, ethoxy, n-propoxy, isopropoxy, n-butoxy)

$C_7$-$C_{15}$-aralkyl groups having 6 to 10 carbon atoms in the aryl moiety and 1 to 9 carbon atoms in the alkyl moiety, for example $C_7$-$C_{12}$-phenylalkyl, such as benzyl, phenylethyl, phenyl-n-propyl, phenyisopropyl or phenyl-n-butyl, particularly preferably benzyl $C_6$-$C_{14}$-aryl groups, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl amino groups $NR^1R^2$, where $R^1$ and $R^2$ together or separately are hydrogen, $C_1$-$C_{12}$-alkyl groups, $C_7$-$C_{15}$-aralkyl radicals or $C_6$-$C_{14}$-aryl groups (in each case as defined above) and additionally may also form a saturated or unsaturated 5- to 10-membered ring, the dimethylamino, the diethylamino, the diisopropylamino and the methylphenylamino group being preferred. Examples of amino groups having saturated rings are the N-piperidyl group and the N-pyrrolidinyl group; examples of amino groups having unsaturated rings are the N-pyrryl group, the N-indolyl group and the N-carbazolyl group.

The abovementioned $C_1$-$C_{12}$-alkyl groups, $C_1$-$C_{12}$-alkoxy groups, $C_7$-$C_{15}$-aralkyl groups, $C_6$-$C_{14}$-aryl groups and amino groups $NR^1R^2$ may each be present in unsubstituted form on the quinoid skeleton of the formulae Ia and Ib. They can themselves also additionally have one or more of the following substituents on their own molecular skeleton:

halogens $C_1$-$C_{12}$-alkyl groups, $C_1$-$C_{12}$-alkoxy groups or amino groups having hydrogen and/or $C_1$-$C_{12}$-alkyl groups, defined as above in each case;

$C_3$-$C_{12}$-cycloalkyl groups, such as cyclopropyl, cyclobutyl, cyclopentyl, cyclohexyl, cycloheptyl, cyclooctyl, cyclononyl, cyclodecyl, cycloundecyl and cyclododecyl, preferably cyclopentyl, cyclohexyl and cycloheptyl;

$C_1$-$C_{12}$-thioether groups, such as methylmercaptyl, ethylmercaptyl, n-propylmercaptyl, isopropylmercaptyl, n-butylmercaptyl, isobutylmercaptyl, tert-butylmercaptyl, n-pentylmercaptyl, isopentylmercaptyl, neopentylmercaptyl, n-hexylmercaptyl;

carboxyl groups, if appropriate also in the form of their salts, preferably their alkali metal salts, in particular in the form of their lithium, sodium or potassium salts, and their ammonium salts;

sulfo groups, if appropriate also in the form of their salts, preferably their alkali metal salts, in particular in the form of their lithium, sodium or potassium salts, and their ammonium salts.

It is furthermore possible to use those compounds of the formulae Ia and Ib which are bridged with one another by one or more $C_1$-$C_{12}$-alkylene bridges, in particular by one or more $C_2$-$C_{10}$-alkylene bridges, particularly preferably by one or more $C_3$-$C_8$-alkylene bridges, by one or more $C_2$-$C_{12}$-alkylated azo bridges, in particular by one or more $C_4$-$C_{10}$-alkylated azo bridges.

In addition, identical or different compounds of the formulae Ia and Ib may also be bridged by bridges of the formula II

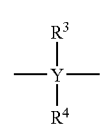

II where Y is silicon or germanium and $R^3$ and $R^4$ are hydrogen and/or a $C_1$-$C_{12}$-alkyl group. Silicon-based bridges are preferably used for this purpose.

Selected quinoid compounds of the formula Ia, which are very particularly suitable, are shown below as formulae Ia1 to Ia19:

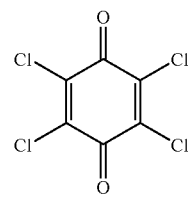

Ia1

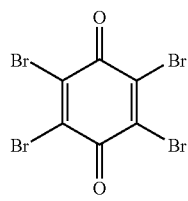
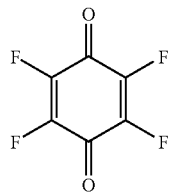
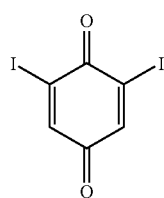
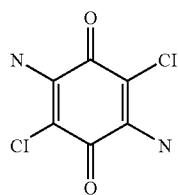
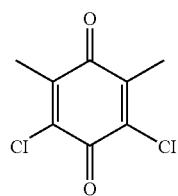
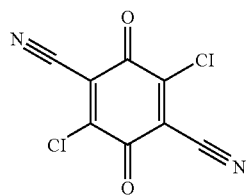
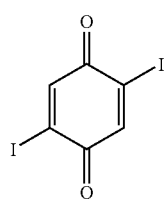
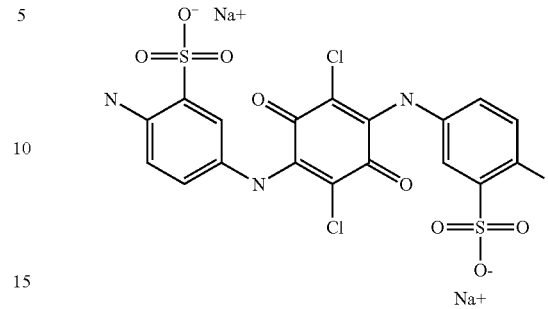
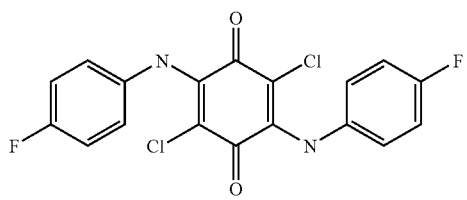
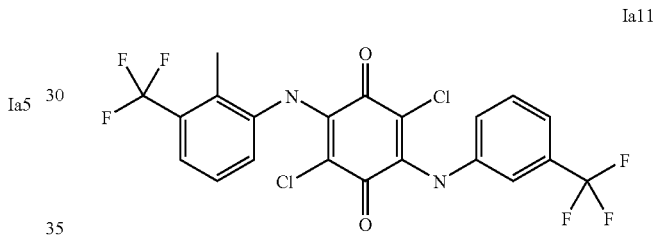
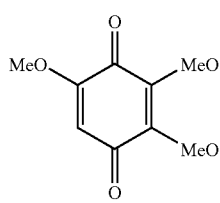
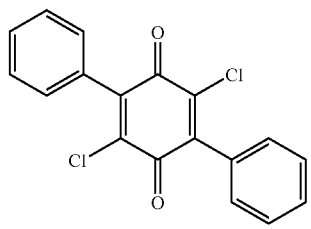
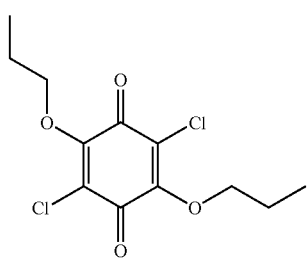

-continued

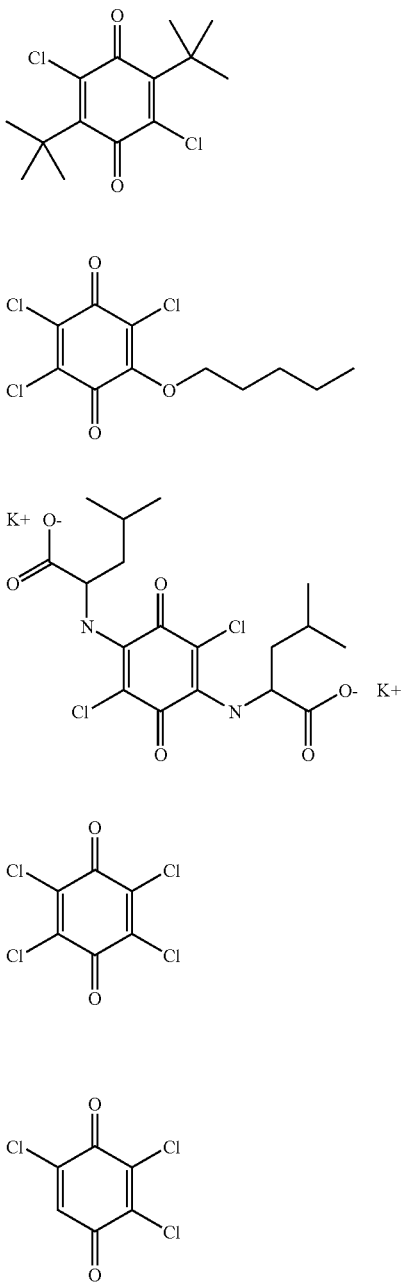

Particularly suitable quinoid compounds of the formula Ib are shown below as formulae Ib1 and Ib2:

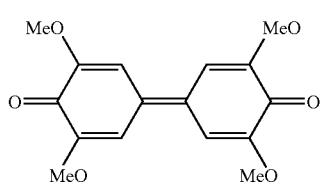

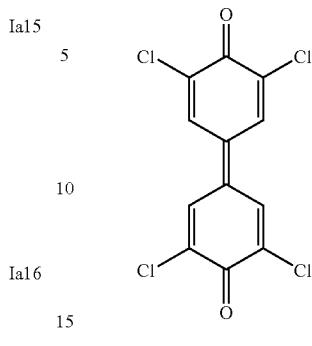

Particularly suitable quinoid compounds which consist of a plurality of compounds of the formula Ia which are bridged with one another are shown below as formulae IaI and IaII.

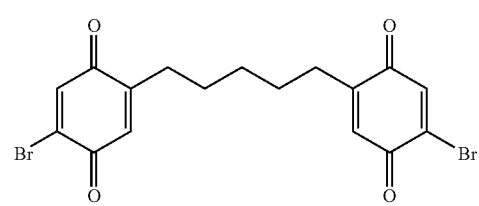

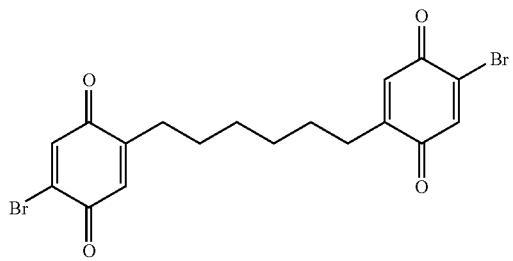

The synthesis of the quinoid compounds of the formulae Ia and Ib is known per se. Synthesis methods for such compounds are to be found, inter alia, in DE-A 2923206, EP-A 046331, EP-A 046328 or EP-A 052929.

The compounds Ia and Ib can be used in mixtures in ratios of from 0:100 to 100:0. Preferred embodiments are 0:100, 10:90, 50:50, 90:10 and 100:0 mol % and all values in between.

The quinoid compounds of the formulae Ia and Ib and the metal compound of the formula $M(L^2)_2$, $M(L^2)_2(L^1)_{z1}$ or $M(L^1)_{z2}$ are combined with a phosphine compound III of the formula $(R')_aPH_{3-a}$, where R' is a $C_1$-$C_{12}$-alkyl group, $C_3$-$C_{12}$-cycloalkyl group, $C_7$-$C_{15}$-aralkyl group or $C_6$-$C_{14}$-aryl group which is substituted by at least one polar radical P, the polar radical P being selected from the group consisting of hydroxyl (—OH), carboxyl (—CO$_2$H), sulfo (—SO$_3$H), hydroxysulfonyloxy (—O—SO$_3$H) or phosphono (—PO₃H₂) groups and the possible alkali metal, alkaline earth metal and/or ammonium salts thereof, alkanolammonium, pyridinium, imidazolinium, oxazolinium, morpholinium, thiazolinium, quinolinium, isoquinolinium, tropylium, sulfonium, guanidinium and phosphonium groups and amino groups of the formula IV $$—N^{\oplus}R^7R^8R^9 \qquad \text{IV, where}$$

R⁷, R⁸ and R⁹, independently of one another, are hydrogen or a $C_1$-$C_{12}$-alkyl group, or a group of the formula V, VI or VII $$-(EO)_k—(PO)_l—R^{10} \qquad V,$$

$$—(PO)_l-(EO)_k—R^{10} \qquad VI,$$

$$-(EO_k/PO_l)—R^{10} \qquad \text{VII, where}$$

EO is a —CH₂—CH₂—O— group,
PO is a —CH₂—CH(CH₃)—O— or a —CH(CH₃)—CH₂—O— group,
k and l are numerical values from 0 to 50, often from 0 to 30 and often from 0 to 15 but k and l are not simultaneously 0,
R¹⁰ is hydrogen, a $C_1$-$C_{12}$-alkyl group or a sulfo group or the corresponding alkali metal, alkaline earth metal and/or ammonium salt thereof, and
a is 1, 2 or 3.

It is of course also possible for the radical or radicals R' to be substituted by 2, 3 or even more polar radicals P.

The quinoid compounds of the formulae Ia and Ib and the metal compound of the formula $M(L^2)_2$, $M(L^2)_2(L^1)_{z1}$ or $M(L^1)_{z2}$ can also be combined with a diphosphine compound VIII of the formula $(R')_bPH_{2-b}G$-$PR_2"$, where R" is hydrogen or has the same meaning as R', G is a $C_1$-$C_{12}$-alkylene group, $C_3$-$C_{12}$-cycloalkylene group, $C_7$-$C_{15}$-aralkylene group or $C_6$-$C_{14}$-arylene group, and b is 1 or 2. The alkylene, cycloalkylene, aralkylene or arylene groups are divalent functional groups which are derived from the corresponding abovementioned alkyl, cycloalkyl, aralkyl or aryl groups.

Of course, mixtures of the phosphine compounds III and VIII can also be combined with the compounds of the formulae Ia and Ib and the metal compound of the formula $M(L^2)_2$, $M(L^2)_2(L^1)_{z1}$ or $M(L^1)_{z2}$.

The corresponding anions of the abovementioned polar radicals IV are nonnucleophilic anions, for example perchlorate, sulfate, phosphate, nitrate and carboxylates, such as acetate, trifluoroacetate, trichloroacetate, propionate, oxalate, citrate or benzoate, and conjugated anions and organosulfonic acids, for example methylsulfonate, trifluoromethylsulfonate and para-toluenesulfonate, and furthermore tetrafluoroborate, tetraphenylborate, tetrakis(pentafluorophenyl)borate, tetrakis[bis(3,5-trifluoromethyl)-phenyl]borate, hexafluorophosphate, hexafluoroarsenate or hexafluoroantimonate.

Furthermore, in formulae V and VI: $(EO)_k$ is intended to be a block of k-CH₂—CH₂—O— groups and
$(PO)_l$ is intended to be a block of l—CH₂—CH(CH₃)—O— or —CH(CH₃)—CH₂—O— groups, and
formula VIII: $(EO_k/PO_l)$ is intended to be a mixture of k-CH₂—CH₂—O— groups and l—CH₂—CH(CH₃)—O— or —CH(CH3)-CH2-O— groups in random distribution.

The molar ratio of compound Ia and Ib on the one hand and phosphine compound III or VIII on the other hand is from 1:1000 to 1000:1, frequently from 1:10 to 10:1, often from 1:2 to 2:1.

Phosphine compounds III and VIII can be prepared by conventional syntheses of organic chemistry [in this context, cf. for example Aqueous-Phase Organometallic Chemistry, B. Cornils, W. A. Herrmann (Editors), Wiley-VCH, Weinheim, 1998; F. Joo et al., Inorg. Synth. 32 (1998), 1 to 43; W. A. Herrmann and C. W. Kohlpainter, Angew. Chem. 105 (1993), 1588 et seq.; H. Schindbauer, Monatsh. Ch. 96 (1965), 2051 et seq.; O. Herd et al., Angew. Chem. 105 (1993), 1097 et seq. or DE-A 4141299] and some of them are also commercially available.

Examples of phosphine compounds III are in particular
4-(diphenylphosphino)benzenesulfonic acid,
3-(diphenylphosphino)benzenesulfonic acid,
tris(4-sulfophenyl)phosphane,
tris(3-sulfophenyl)phosphane
and the corresponding alkali metal or ammonium salts thereof, for example the lithium, sodium, potassium or ammonium salts thereof, or
2-(2-{2-[4-(diphenylphosphino)phenoxy]ethoxy}ethoxy)ethanol.

Examples of phosphine compounds VIII are in particular
1,3-bis(di-4-hydroxyphenyl)phosphinopropane,
1,3-bis(di-4-hydroxybutyl)phosphinopropane,
1,3-bis(di-4-methylol-5-hydroxypentyl)phosphinopropane,
1,3-bis(di-5-hydroxypentyl)phosphinopropane,
1,3-bis(di-6-hydroxyhexyl)phosphinopropane,
1,3-bis(di(3-hydroxycyclopentyl)propyl)phosphinopropane,
1,3-bis(di-8-hydroxyoctyl)phosphinopropane,
1,3-bis(di(3-hydroxycyclohexyl)propyl)phosphinopropane,
1,3-bis(di-4-sulfophenyl)phosphinopropane,
1,3-bis(di-4-sulfobutyl)phosphinopropane,
1,3-bis(di-4-methylol-5-sulfopentyl)phosphinopropane,
1,3-bis(di-5-sulfopentyl)phosphinopropane,
1,3-bis(di-6-sulfohexyl)phosphinopropane,
1,3-bis(di(3-sulfocyclopentyl)propyl)phosphinopropane,
1,3-bis(di-8-sulfooctyl)phosphinopropane,
1,3-bis(di(3-sulfocyclohexyl)propyl)phosphinopropane,
1,3-bis(di-4-carboxyphenyl)phosphinopropane,
1,3-bis(di4-carboxybutyl)phosphinopropane,
1,3-bis(di4-methylol-5-carboxypentyl)phosphinopropane,
1,3-bis(di-5-carboxypentyl)phosphinopropane,
1,3-bis(di-6-carboxyhexyl)phosphinopropane,
1,3-bis(di(3-carboxycyclopentyl)propyl)phosphinopropane,
1,3-bis(di-8-carboxyoctyl)phosphinopropane or
1,3-bis(di(3-carboxycyclohexyl)propyl)phosphinopropane.

The quinoid compounds of the formula Ia or Ib are combined not only with one of the phosphine compounds III or VIII but also with one or more metal compounds of the formula $M(L^2)_2$, $M(L^2)_2(L^1)_{z1}$ or $M(L^1)_{z2}$. The variables are defined as follows:

L¹ is selected from phosphanes of the formula $(R^5)_xPH_{3-x}$ or amines of the formula $(R^5)_xNH_{3-x}$, where x is an integer from 0 to 3. However, ethers $(R^5)_2O$, such as diethyl ether or tetrahydrofuran, water, alcohols $(R^5)$OH, such as methanol or ethanol, pyridine, pyridine derivatives of the formula $C_5H_{5-x}(R^5)_xN$, for example 2-picoline, 3-picoline, 4-picoline, 2,3-lutidine, 2,4-lutidine, 2,5-lutidine, 2,6-lutidine or 3,5-lutidine, carbon monoxide, $C_1$-$C_{12}$-alkylnitriles or $C_6$-$C_{14}$-arylnitriles, such as acetonitrile, propionitrile, butyronitrile or benzonitrile, are also suitable. Furthermore, mono- or polyethylenically unsaturated double bond systems also serve as the ligand, such as ethene, propene, cis-2- butene, trans-2-butene, cyclohexene or norbornene, but also the corresponding radicals thereof. 1,5-Cyclooctadiene (COD), 1,6-cyclodecadiene and 1,5,9-all-trans-cyclododecatriene are frequently used.

$R^5$ is selected from hydrogen, $C_1$-$C_{12}$-alkyl groups, which in turn may be substituted by O($C_1$-$C_6$-alky) or N($C_1$-$C_6$-alkyl)$_2$ groups, and $C_3$-$C_{12}$-cycloalkyl groups, $C_7$-$C_{15}$-alkyl radicals and $C_6$-$C_{14}$-aryl groups, where specific examples of these groups are to be found under the definition of the radical R.

$L^2$ is selected from halide ions, such as fluoride, chloride, bromide or iodide; chloride and bromide being preferred, amide anions $(R^6)_y NH^{\square}_{2-y}$, where y is an integer 0, 1 or 2 and $R^6$ is $C_1$-$C_{12}$-alkyl, $C_1$-$C_6$-alkyl anions, such as methyl, ethyl, n-propyl, isopropyl, n-butyl, tert-butyl or n-hexyl anions, allyl anions or methallyl anions, benzyl anions or aryl anions, such as the phenyl anion.

M is a transition metal of groups 7 to 10 of the Periodic Table of the Elements; manganese, iron, cobalt, nickel and palladium are preferred and nickel is particularly preferred.

z1 is an integer 1, 2, 3 or 4.

z2 is an integer 1, 2, 3, 4, 5 or 6, often 4 or 6.

In a particular embodiment, $L^1$ and $L^2$ are linked to one another by one or more covalent bonds.

Frequently used metal compounds are olefin complexes of nickel. A preferred metal compound is Ni(COD)$_2$.

The conditions for the reaction of the compounds of the formulae Ia and Ib with the metal compound and at least one of the phosphine compounds III or VIII are not critical per se. Usually, they are reacted at from 0 to 100° C. in a solvent which may be selected from aliphatic or aromatic hydrocarbons, for example n-heptane, toluene, ethylbenzene, orthoxylene, meta-xylene or para-xylene. Chlorobenzene is also suitable as a solvent, and furthermore ketones, for example acetone, acyclic or cyclic ethers, for example diethyl ether, diisopropyl ether, 1,4-dioxan or tetrahydrofuran. However, water or water-soluble alcohols, for example methanol, ethanol, n-propanol, isopropanol or n-butanol, can also be used as a solvent in the in situ catalyst preparation. Water, water-soluble alcohols or ketones, for example isopropanol or acetone, are preferably used.

Preferably, however, the quinoid compound Ia or Ib is first mixed with the phosphine compound III or VIII and then reacted with the metal compound to give the in situ catalyst.

Ratios of from 1:1000 to 1000:1 have proven useful as the molar ratio of metal compound to phosphine compound III, preferably from 1:10 to 10:1 and particularly preferably from 1:2 to 2:1. If a phosphine compound VIII is used, the corresponding molar ratio is from 1:500 to 500:1, preferably from 1:5 to 5:1 and particularly preferably 1:1.

The molar ratio of metal compound to compound Ia or Ib is likewise from 1:1000 to 1000:1, preferably from 1:10 to 10:1, in particular from 1:2 to 2:1.

It is possible to react the metal compound with the chosen organic quinoid compounds and the phosphine compound outside the polymerization reactor and then to introduce the reaction solution into the polymerization reactor.

The reaction of metal compound, phosphine compound and quinoid compound can also be effected inside the polymerization reactor, and it may be advantageous also to add other substances, for example emulsifiers or further solvents, monomers to be polymerized and other assistants, for example activators.

The choice of the reaction conditions depends in each case on the substances used. Particularly in the case of water-sensitive precursors, it has proven advantageous first to react the precursors outside the polymerization reactor and then to meter the reaction product into the polymerization reactor.

This procedure is also advantageous when the precursors do not dissolve completely in the solvent used, but the reaction product does.

Isolation and purification of the complexes formed in situ (reaction products of metal compound, phosphine compound and quinoid compound) are dispensed with.

The complexes produced in situ are very useful in the polymerization or copolymerization of olefins in water or in a solvent mixture which contains at least 50% by weight of water. The polymerization is carried out in the presence of an emulsifier and optionally in the presence of an activator.

It is frequently advisable to use an activator in order to increase the activity of the in situ complex. In the context of this document, an activator is understood as meaning all those compounds which are capable of increasing the activity of the in situ complex.

The polymerization of the 1-olefins in the novel process can be carried out in a manner known per se.

The sequence of addition of the reagent in the polymerization is not critical. Thus, gaseous monomer can first be brought into contact with the solvent under pressure or liquid monomer can be metered in, and the mixture of quinoid compound, phosphine compound and metal compound is then added. However, the mixture of quinoid compound, phosphine compound and metal compound can also first be diluted with further solvent and then monomer added.

At the same time, the activator, if it is necessary, is added either direct or in a solution in a second portion of the same solvent or in acetone.

The actual polymerization usually takes place at a minimum pressure of 1 bar, the polymerization rate being too low below this pressure. The minimum pressure is preferably 2, particularly preferably 10, bar (in each case gage pressure).

The maximum pressure is, for example, 4000 bar; at higher pressures the requirements with regard to the material of the polymerization reactor are very high, and the process becomes uneconomical. $\leqq 100$ bar are preferred and $\leqq 50$ bar are particularly preferred.

The polymerization temperature can be varied within a wide range. The minimum temperature is, for example, $\geqq 10°$ C., since the polymerization rate declines at low temperatures. A minimum temperature of $\geqq 40°$ C. or $\geqq 65°$ C. is preferred. An example of an expedient maximum temperature is 350° C.; $\leqq 150°$ C. or $\leqq 100°$ C. are preferred.

Suitable organic solvents in the aqueous polymerization medium are aromatic solvents, such as benzene, toluene, ethylbenzene, ortho-xylene, meta-xylene and para-xylene and mixtures thereof. Cyclic ethers, such as tetrahydrofuran and dioxane, or acyclic ethers, such as diethyl ether, di-n-butyl ether, diisopropyl ether or 1,2-dimethoxyethane, are furthermore suitable. Ketones, such as acetone, methyl ethyl ketone and diisobutyl ketone are also suitable, as are amides, such as dimethylformamide or dimethylacetamide, water-soluble alcohols, for example methanol, ethanol, n-propanol, isopropanol or n-butanol, and mixtures of these solvents.

Acetone or the water-soluble alcohols methanol, ethanol, n-propanol, isopropanol or n-butanol are preferred as organic solvents in the aqueous polymerization medium, the mixing ratio of the organic solvents being arbitrary.

The amount of the aqueous polymerization medium is likewise not critical, but it must be ensured that the complex formed in situ and the activator can dissolve completely, otherwise lower activities must be expected. The dissolution process can, if appropriate, be accelerated by ultrasonic treatment.

The emulsifier which is also to be added can be introduced into the aqueous polymerization medium either directly or together with the solution of the catalyst complex formed in situ.

The amount of the emulsifier is chosen so that the mass ratio of monomer to emulsifier is greater than 1, preferably greater than 10, particularly preferably greater than 20. The less emulsifier which has to be used, the more advantageous.

As a result of the addition of the emulsifier, both the polymerization rate and the stability of the aqueous polymer dispersions formed are increased. The added emulsifier may be nonionic or ionic.

Customary nonionic emulsifiers are, for example, ethoxylated mono-, di- and trialkylphenols (degree of ethoxylation: 3 to 50, alkyl radical: $C_4$-$C_{12}$) and ethoxylated fatty alcohols (degree of ethoxylation: 3 to 80; alkyl radical: $C_8$-$C_{36}$). Examples of these are Lutensol® grades from BASF AG or Triton® grades from Union Carbide.

Conventional anionic emulsifiers are, for example, alkali metal and ammonium salts of alkylsulfates (alkyl radical: $C_8$-$C_{12}$), of sulfuric monoesters of ethoxylated alkanols (degree of ethoxylation: 4 to 30, alkyl radical: $C_{12}$-$C_{18}$) and of ethoxylated alkyphenols (degree of ethoxylation: 3 to 50, alkyl radical: $C_4$-$C_{12}$), of alkanesulfonic acids (alkyl radical: $C_{12}$-$C_{18}$) and of alkylarylsulfonic acids (alkyl radical: $C_9$-$C_{18}$). It is of course also possible to use alkyldiphenyl ethers, for example Dowfax® 2A1 (trademark of Dow Chemical Company).

Suitable cationic emulsifiers are as a rule primary, secondary, tertiary or quaternary ammonium salts, alkanolammonium salts, pyridinium salts, imidazolinium salts, oxazolinium salts, morpholinium salts and thiazolinium salts having a $C_6$-$C_{18}$-alkyl, $C_6$-$C_{18}$-aralkyl or heterocyclic radical, and salts of amine oxides, quinolinium salts, isoquinolinium salts, tropylium salts, sulfonium salts and phosphonium salts. Examples are dodecylammonium acetate or the corresponding hydrochloride, the chlorides or acetates of the various 2-(N,N,N-trimethylammonium)ethylparaffin acid esters, N-cetylpyridinium chloride, N-laurylpyridinium sulfate and N-cetyl-N,N,N-trimethylammonium bromide, N-dodecyl-N,N,N-trimethylammonium bromide, N,N-distearyl-N,N-dimethylammonium chloride and the Gemini surfactant N,N'-(lauryldimethyl)ethylenediamine dibromide. Numerous further examples are to be found in H. Stache, Tensid-Taschenbuch, Carl-Hanser Verlag, Munich, Vienna, 1981, and in McCutcheon's, Emulsifiers & Detergents, MC Publishing Company, Glen Rock, 1989.

Nonionic and anionic emulsifiers, in particular anionic emulsifiers, are preferably used for the novel process.

Polymerization reactors which have proven suitable are stirred kettles and autoclaves as well as tubular reactors, it being possible for the tubular reactors to be in the form of a loop reactor.

The olefin or olefins to be polymerized is or are mixed in the aqueous polymerization medium. The polymerization medium used may be water or a mixture of water with the abovementioned solvents.

However, it must be ensured that the amount of water is at least 50, preferably at least 90, particularly preferably at least 95, % by weight, based in each case on the total polymerization medium, formed from organic solvent, demineralized water, quinoid compounds, phosphine and metal compounds, emulsifiers and, if appropriate, further assistants.

The solutions of complexes produced in situ, of the emulsifier and, if appropriate, the activator are combined with the mixture of monomer and aqueous polymerization medium. The sequence of addition of the various components is not critical per se. However, the components must be combined sufficiently rapidly to avoid crystallization of sparingly soluble complex compounds which may occur as intermediates.

The molar ratio of metal compound of the formula $M(L^2)_2$, $M(L^2)_2(L^1)_{z1}$ or $M(L^1)_{z2}$ to the olefin used is $1:\geqq 100$, $1:\geqq 1000$, $1:\geqq 10\,000$ or $1:\geqq 100\,000$ and all values in between. Depending on the reactivity of the complex formed in situ, the olefin/metal compound ratio may have even higher values.

Suitable polymerization processes are in principle continuous and batchwise processes. Semibatch processes in which olefin or olefin mixture is further metered in the course of the polymerization after all components have been mixed are preferred.

Aqueous polymer dispersions are initially obtained by the novel process. Often, these aqueous polymer dispersions have solids contents of $\geqq 10$, $\geqq 20$ or even $\geqq 30\%$ by weight.

The mean particle diameters of the polymer particles in the novel dispersions are from 1 to 1000 nm, preferably from 10 to 500 nm, particularly preferably from 10 to 200 nm. The distribution of the particle diameters can, but need not, be very uniform. For some applications, in particular for those with high solids contents (>55% by weight), broad or bimodal distributions are even preferred. The particle diameters can be determined, for example, by light scattering methods. An overview is to be found in D. Distler (Editor), Wässrige Polymerdispersionen, Wiley-VCH Verlag, 1st Edition, 1999, Chapter 4.

The polymers obtained by the novel process have technically interesting properties. In the case of polyethylene, they may have a high crystallinity, which can be detected, for example, by the number of branches. Frequently, less than 40 branches, preferably less than 20 branches, particularly preferably less than 10 branches, are present per 1000 carbon atoms of the polymer, determined by $^1$H-NMR and $^{13}$C-NMR spectroscopy.

The molecular weight distributions of the polyolefins obtainable by the novel process, i.e. the Q values (Mw/Mn) are from 1.0 to 50, preferably from 1.5 to 10. The molar masses of the polyolefins obtained are from 500 to 1 000 000, often from 1000 to 50 000 or from 1000 to 10 000 (number average).

Also of importance is the fact that the polymer particles obtained may have different particle morphologies. In particular, for example, spherical (x axis=y axis=z axis), linear (y axis<x axis and z axis; x axis≅z axis), acicular (y axis and z axis<x axis; y axis≅z axis) and, in the case of polyethylene, also lamellar polymer particles are obtainable.

In addition to the advantageous price owing to the cheap olefinic starting materials and the simple process, another advantage of the novel dispersions is that they are more stable to weathering than dispersions of polybutadiene or butadiene copolymers. Compared with dispersions of polymers with acrylates or methacrylates as the main monomer, the lower tendency to hydrolyse should be mentioned as being advantageous. Another advantage is that most olefins are readily volatile, and unpolymerized residual amounts of olefins can be readily removed. Finally, the fact that, during the polymerization, it is not necessary to add a molar mass regulator, for example tert-dodecyl mercaptan, which on the one hand may be difficult to separate off and on the other hand have an unpleasant odor, is advantageous. Furthermore, it is advantageous that the aqueous dispersions obtained from the novel process have a relatively high solids contents.

Also of importance is that, in contrast to all known emulsion polymerization processes, the novel process is particularly suitable for the preparation of aqueous polymer dispersions of very small polyethylene particles. The small particle sizes result in complete or virtually complete transparency of the aqueous polymer dispersions.

The polymer particles can be obtained from the initially obtained aqueous dispersions by removing the water and any organic solvent or solvents. Numerous conventional methods are suitable for removing the water and any organic solvent or solvents. For example freeze drying, spray drying or evaporation. The polymer particles thus obtained have a good morphology and a high bulk density.

The dispersions prepared according to the invention can be advantageously used in numerous applications, for example paper applications, such as paper coating or surface sizing, and furthermore in paints and finishes, construction chemicals, adhesive raw materials, molded foams, textile and leather applications, carpet backing coatings, mattresses or pharmaceutical applications.

Paper coating is understood as meaning the coating of the paper surface with aqueous pigmented dispersions. Owing to their favorable price, the dispersions prepared according to the invention are advantageous. Surface sizing is understood as meaning the pigment-free application of substances imparting water repellency. In particular, the polymer dispersions obtainable to date under economical conditions only with difficulty are particularly hydrophobic substances and therefore advantageous. Another advantage is that, during the novel preparation of the dispersions for paper coating or surface sizing, it is not necessary to add any molar mass regulators, for example tert-dodecyl mercaptan, which on the one hand may be difficult to separate off and on the other hand have an unpleasant odor.

The dispersions prepared according to the invention are particularly suitable in paints and coatings because they have a very advantageous price. Particularly advantageous are aqueous polyethylene dispersions because they furthermore have particular UV stability. Aqueous polyethylene dispersions are furthermore particularly suitable because they are resistant to basic chemicals which are customary in construction chemistry.

The dispersions prepared according to the invention have economic advantages in adhesives, in particular in adhesives for self-adhesive labels or films and plasters, but also in construction adhesives or industrial adhesives. Particularly in construction adhesives, they are especially advantageous because they are resistant to basic chemicals which are customary in construction chemistry.

In molded foams which can be produced by processes known per se, such as the Dunlop process or the Talalay process, from the dispersions prepared according to the invention, the advantageous price of the novel dispersions is once again advantageous. Gelling agents, soaps, thickeners and vulcanization pastes serve as further components. Molded foams are processed, for example, to give mattresses.

Textile and leather applications serve for stabilizing and finishing textile or leather. Among the effects, the impregnation and the further finishing of the textiles may be mentioned by way of example. In addition to the favorable price, another advantage of the dispersions prepared according to the invention as component in textile and leather applications is the freedom from odor, since the residual amounts of olefin in the aqueous dispersions can be readily removed.

Carpet backing coatings serve for adhesively bonding carpet fibers to the backing and furthermore perform the function of giving the carpet the necessary stiffness and of uniformly distributing additives, for example flameproofing agents or antistatic agents. In addition to the favorable price, another advantage of the dispersions prepared according to the invention is the insensitivity to the conventional additives. In particular, polyethylene dispersions have proven to be particularly chemically inert. Finally, the fact that, during the novel preparation of the dispersions for carpet backing coatings, it is not necessary to add any molar mass regulators, for example tert-dodecyl mercaptan which have the abovementioned disadvantages, is advantageous.

Pharmaceutical formulations are understood as meaning dispersions as carriers of medicaments. Dispersions as carriers of medicaments are known per se. Advantages of the dispersions prepared according to the invention as carriers of medicaments is the favorable price and the resistance to body influences, such as gastric juice or enzymes.

Working Examples

General: Unless stated otherwise, the syntheses were carried out by the Schlenk method in the absence of air and moisture under an argon atmosphere.

The molar masses of the polymers obtained were determined by means of GPC. On the basis of DIN 55672, the following conditions were chosen: solvent: 1,2,4-trichlorobenzene, flow rate: 1 ml/min; temperature: 140° C. Measurement was effected using a Waters 150 C apparatus which had been calibrated using polyethylene standards.

The solids content was determined by precipitating the polyethylene with methanol.

EXAMPLE 24.5 mg (100 μmol) of 2,3,5,6-tetrachloro-para-benzoquinone (Ia1) and 38 mg (100 μmol) of the potassium salt of 4-(diphenylphosphino)benzenesulfonic acid were dissolved in 10 ml of anhydrous and degassed isopropanol at from 20 to 25° C. (room temperature) in a Schlenk flask with stirring and under an argon inert gas atmosphere, the solution acquiring an orange color. This solution was transferred under an argon atmosphere into another Schlenk flask, which contained 30.3 mg (110 μmol) of nickel (1,5-cyclooctadiene)$_2$ [Ni(COD)$_2$], and was stirred for 20 minutes.

In the meantime, a solution of 1 g of sodium dodecylsulfate (SDS) in 90 ml of degassed and demineralized water was prepared. This solution was introduced at room temperature under an argon atmosphere into a pressure-resistant 300 ml reactor. The isopropanolic solution of catalyst prepared in situ was likewise added to the reactor with stirring (1000 revolutions per minute). Ethylene was then forced into the reactor to a pressure of 40 bar (gauge pressure). Thereafter, the liquid reactor content was heated to 70° C. with stirring and left at this temperature for 2 hours. Thereafter, the reactor content was cooled to room temperature and let down to atmospheric pressure. The polymer dispersion obtained exhibited only slight turbidity.

60 g of methanol were added to 40 g of the aqueous polymer dispersion obtained, with stirring, 5.32 g of polyethylene (corresponding to a polymer solids content of 13.3% by weight) being precipitated. The polymer had a number average molecular weight of about 6000 g/mol and a weight average molecular weight of about 32 400. The melting point of the polyethylene was 129° C.

Comparative Example

The comparative example was effected analogously to the example, except that, instead of the potassium salt of 4-(diphenylphosphino)benzenesulfonic acid, 26.3 mg of unsubstituted triphenylphosphine were used.

After the end of the reaction and precipitation with methanol, 0.3 g of polyethylene, corresponding to a polymer solids content of 0.7% by weight, was obtained.

We claim:

1. A process for the emulsion polymerization of one or more olefin, comprising:

preparing a catalyst by reacting a quinoid compound of the formula Ia or Ib or a mixture of at least two of the compounds Ia or Ib

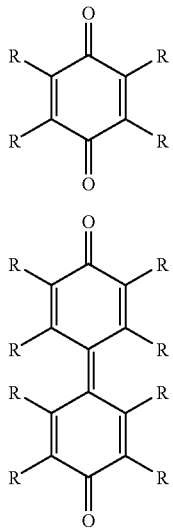

where R in each case is one or more of the following radicals: hydrogen, halogen, a nitrile, a $C_1$-$C_{12}$-alkyl group, a $C_1$-$C_{12}$-alkoxy group, a $C_7$-$C_{15}$-aralkyl group, a $C_6$-$C_{14}$-aryl group, unsubstituted or substituted by: $C_1$-$C_{12}$-alkyl groups, halogens, $C_1$-$C_{12}$-alkoxy groups, $C_3$-$C_{12}$-cycloalkyl groups, $C_1$-$C_{12}$-thioether groups, optionally carboxyl groups or sulfo groups present in the form of their salts, and amino groups with hydrogen and/or $C_1$-$C_{12}$-alkyl radicals;

amino groups $NR^1R^2$, where $R^1$ and $R^2$ together or separately are hydrogen, $C_1$-$C_{12}$-alkyl groups, $C_7$-$C_{15}$-aralkyl radicals and $C_6$-$C_{14}$-aryl groups and optionally additionally form a saturated or unsaturated 5- to 10-membered ring, unsubstituted or substituted by: $C_1$-$C_{12}$-alkyl groups, halogens, $C_1$-$C_{12}$-alkoxy groups, $C_3$-$C_{12}$-cycloalkyl groups, $C_1$-$C_{12}$-thioether groups, optionally carboxyl groups or sulfo groups present in the form of their salts, and amino groups with hydrogen and/or $C_1$-$C_{12}$-alkyl radicals, wherein identical or different compounds of the formulae Ia and Ib, are optionally bridged by one or more $C_1$-$C_{12}$-alkylene bridges, $C_2$-$C_{12}$-alkylated azo bridges or bridges of the formula II

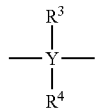

wherein Y is silicon or germanium and $R^3$ and $R^4$ are hydrogen and/or a $C_1$-$C_{12}$-alkyl group;

with a phosphine compound which is a compound III of the formula $(R')_aPH_{3-a}$, wherein a is 1, 2 or 3; R' is a $C_1$-$C_{12}$-alkyl group, $C_3$-$C_{12}$-cycloalkyl group, $C_7$-$C_{15}$-aralkyl group or $C_6$-$C_{14}$-aryl group, which is substituted by at least one polar radical P, the polar radical P being selected from the group consisting of hydroxyl, carboxyl, sulfo, hydroxysulfonyloxy or phosphono groups and the alkali metal, alkaline earth metal and/or ammonium salts thereof, alkanolammonium, pryidinium, imidazolinium, oxazolinium, morpholinium, thiazolinium, quinolinium, isoquinolinium, tropylium, sulfonium, guanidinium and phosphonium groups and ammonium groups of the formula IV —$N^{\oplus}R^7R^8R^9$ (IV), where $R^7$, $R^8$ and $R^9$, independently of one another, are hydrogen or a $C_1$-$C_{12}$-alkyl group; or a group of the formula V, VI or VII -$(EO)_k$—$(PO)_l$—$R^{10}$ V, —$(PO)_l$-$(EO)_k$—$R^{10}$ VI, —$(EO_k/(PO_l)$—$R^{10}$ VII; where EO is a —$CH_2$—$CH_2$—O— group, PO is a —$CH_2$—$CH(CH_3)$—O— or a —$CH(CH_3)$—$CH_2$—O— group, k and l are numerical values from 0 to 50, but k and l are not simultaneously 0, $R^{10}$ is hydrogen, a $C_1$-$C_{12}$-alkyl group or a sulfo group or an alkali metal, alkaline earth metal and/or ammonium salt thereof, and/or a diphosphine compound VIII of the formula $(R')_bPH_{2-b}$—G—$PR''_2$ where R'' is hydrogen or has the same meaning as R', G is a $C_1$-$C_{12}$-alkylene group, $C_3$-$C_{12}$-cycloalkylene group, $C_7$-$C_{15}$-aralkylene group or $C_6$-$C_{14}$-arylene group, and b is 1 or 2;

and with a metal compound of the formula $M(L^2)_2$, $M(L^2)_2(L^1)_{z1}$ or $M(L^1)_{z2}$, wherein M is a transition metal of groups 7 to 10 of the Periodic Table of the Elements;

$L^1$ is a phosphane $(R^5)_xPH_{3-x}$ or amine $(R^5)_xNH_{3-x}$ having identical or different radicals $R^5$, an ether $(R^5)_2O$, water, an alcohol $(R^5)OH$, pyridine, a pyridine derivative of the formula $C_5H_{5-x}(R^5)_xN$, carbon monoxide, $C_1$-$C_{12}$-alkylnitrile, $C_6$-$C_{14}$-arylnitrile or an ethylenically unsaturated double bond system, where x is an integer ranging from 0 to 3;

$R^5$ is hydrogen, a $C_1$-$C_{12}$-alkyl group, which in turn may be substituted by $O(C_1$-$C_6$-alkyl) or $N$-$(C_1$-$C_6$-alkyl)$_2$ groups;

a $C_3$-$C_{12}$-cycloalkyl group, a $C_7$-$C_{15}$-aralkyl radical or a $C_6$-$C_{14}$-aryl group, $L^2$ is a halide ion, an amide anion $(R^6)_yNH_{2-y}$—, where y is an integer ranging from 0 to 2 and $R^6$ is a $C_1$-$C_{12}$-alkyl group, and furthermore a $C_1$-$C_6$-alkyl anion, allyl anion, benzyl anion or aryl anion, where $L^1$ and $L^2$ may be linked to one another by one or more covalent bonds;

z1 is an integer ranging from 1 to 4; and z2 is an integer ranging from 1 to 6; and subsequently (co)polymerizing at least one olefin in the presence of the prepared catalyst in water or in a solvent mixture which contains at least 50% by weight of water, in the presence of an emulsifier.

2. The process according to claim 1, wherein the olefin (co)polymerization is conducted in the presence of an activator which increases the activity of the in situ formed complex of metal compound, phosphine compound and quinoid compound.

3. The process according to claim 1, wherein the metal compound is an olefin complex of nickel.

4. The process according to claim 1, wherein said emulsifier is an ionic emulsifier.

5. The process according to claim 1, wherein at least one of the olefins is ethylene.

6. The process according to claim 1, wherein ethylene is the main olefin, and the coolefin is a member selected from the group consisting of propylene, 1-butene, 1-hexene and styrene.

7. The process according to claim 1, wherein the olefin to be polymerized is ethylene.

* * * * *